3,477,981
INHIBITION OF CRYSTALLIZATION OF DIGLYCIDYL ETHER OF BISPHENOL A
Ronald L. De Hoff, Maplewood, and George D. Grieco, Ridgefield, N.J., assignors to R. T. Vanderbilt Company, Inc., New York, N.Y., a corporation of New York
No Drawing. Filed May 9, 1967, Ser. No. 637,063
Int. Cl. C08g 45/00, 30/14
U.S. Cl. 260—31.2                    10 Claims

ABSTRACT OF THE DISCLOSURE

The crystallization of the diglycidyl ether of bisphenol A at ambient temperature is inhibited by combining therewith a small but effective amount of tris(hydroxymethyl)aminomethane. Uniform distribution of the small amount of the tris amino compound throughout the diglycidyl ether is facilitated by preparing a prepolymer of the diglycidyl ether with a relatively large amount of the tris amino compound and using said prepolymer to introduce the desired level of the tris amino compound into the final resin.

---

This invention relates to the liquid diglycidyl ether of bisphenol A and to a method for preventing the crystallization of such resin upon standing.

It is known that the diglycidyl ether of bisphenol A (bisphenol A is identified chemically as 2,2-bis(4-hydroxyphenyl)propane; its diglycidyl ether is referred to hereafter as the diglycidyl ether) which is now supplied to the epoxy resin industry has a tendency to crystallize upon standing. This tendency is increased by storage of the diglycidyl ether under fluctuating temperature conditions and by the introduction of the solvents, reactive diluents and fillers which are necessary to secure the desired physical properties in the cured resins prepared from the diglycidyl ether.

It is advantageous to maintain the diglycidyl ether in liquid form, not only for ease in handling, but also to facilitate blending with additives in order to secure rapid and uniform dispersion thereof. When the diglycidyl ether crystallizes or sets up solid in the drum, it must be melted completely before blending with curing agent and other additives, and such heat may cause premature setting up or cure of the resin, e.g., shorten its pot life.

The problem of crystallization has been recognized in the art. U.S. Patent 3,051,681 to Partansky discloses use of a polyglycidyl ether of a novolak resin containing 2 to 5 phenolic hydroxyl groups as a crystallization inhibitor. A mixture containing 2 to 10% by weight of the epoxylated novolak resin is said to remain free of crystals for a month or more at room temperature, while up to 20% is required to inhibit crystallization at temperatures down to 0°. The method of Partansky has the disadvantage of requiring large amounts of crystallization inhibitor, and the search for more effective crystallization inhibitors is the subject of continued research efforts in the industry.

An object of this invention is to provide a means for inhibiting crystallization of the diglycidyl ether of bisphenol A by use of a small amount of crystallization-inhibiting additive. Another object is to inhibit the crystallization of the diglycidyl ether of bisphenol A without changing significantly the weight per epoxide (WPE) property of the resins cured therefrom.

These objects have been accomplished by the incorporation into the diglycidyl ether of bisphenol A of a small amount of tris(hydroxymethyl)aminomethane. The inhibitor is used in a small proportion, generally from 0.02 to 1 part per 100 parts of resin (phr.) which is sufficient to inhibit crystallization of the diglycidyl ether at ambient temperatures but insufficient to change significantly the weight per epoxide of the diglycidyl ether or the physical properties of the resins cured therefrom. An amount of 0.5 phr. prevents crystallization of a highly purified grade of the diglycidyl ether for more than five months, and this is a preferred level.

Because it is difficult to obtain uniform distribution of small quantities of solid tris(hydroxymethyl)aminomethane in the viscous diglycidyl ether, it is preferred to prepare a blend of about 5 phr. to 15 phr. of the tris amino compound in a portion of diglycidyl ether. This blend, which will be hereinafter termed a prepolymer, is then mixed with the diglycidyl ether in an amount sufficient to supply the desired level of the tris amino compound in the mixture.

The preferred method of blending tris(hydroxymethyl)aminomethane with the diglycidyl ether is to heat the diglycidyl ether to about 160° C. before adding the tris amino compound. The tris amino compound is a crystalline material which dissolves readily in the heated diglycidyl ether. After the addition, the mixture is stirred and then cooled. When a level of less than 5 phr. of the tris amino compound is used, the resulting blend is an easily-handled liquid. Other well known methods of blending may be used, such as milling on a 3-roll mill, or mixing a solvent solution of the tris amino compound into the diglycidyl ether.

An interesting advantage of the prepolymer is that it can be held at elevated temperatures up to 250° F. for eight hours or longer without gelation. The viscosity and ease of handling the prepolymer depends upon the proportion of the tris amino compound that is added, for the prepolymer becomes more viscous with increasing concentrations of the tris amino compound. The pre-polymerization reaction which takes place, as evidenced by the disproportionate increase in viscosity, does not materially affect the properties of the final epoxy resin.

The addition of the tris amino compound also inhibits crystallization of mixtures of the diglycidyl ether of bisphenol A with minor amounts of the so-called "reactive diluents," organic solvents, and fillers which tend to aggravate the crystallization problem, especially when the mixtures are subjected to wide fluctuations in temperature. By reactive diluents are meant those monoepoxides commonly introduced to change the properties of the cured resins derived from the diglycidyl ether of bisphenol A. They include such monoepoxides as butyl glycidyl ether, phenyl glycidyl ether, cresyl glycidyl ether, allyl glycidyl ether, and gamma-butyrolactone. Also included are such trade-named products as the epoxide derived from a long chain aliphatic alcohol and known as "Epoxide 7" of Procter & Gamble, and the epoxy ester of mixed aliphatic $C_9$–$C_{11}$ monocarboxylic acids consisting principally of acids having a tertiary carbon alpha to the carboxyl and known as "Cardura E" of Shell Chemical Company.

Organic solvents which may be used in the preparation of epoxy resins and which tend to induce the crystallization of purified diglycidyl ether include lower aromatic hydrocarbons such as benzene, toluene and xylene; lower aliphatic and cycloaliphatic ketones such as acetone, methyl ethyl ketone, diisobutyl ketone, cyclohexanone and methylcyclohexanone; and aliphatic esters of lower monocarboxylic acids such as ethyl acetate, isopropyl acetate, butyl acetate, and the like. These are nonreactive toward the glycidyl ether.

Fillers which induce crystallization include talc, silica, alumina, and calcium carbonate.

The following examples serve to illustrate the invention but are not intended to limit its scope.

Example I

A 100-gram portion of Vanoxy 126, a moderately highly purified diglycidyl ether of bisphenol A (of R. T. Vanderbilt Company, Inc.) was blended with 0.2 gram of tris(hydroxymethyl)aminomethane in a glass beaker and heated and stirred on a hot plate equipped with a magnetic stirrer until a homogeneous solution was obtained. A ten-gram portion of the product, containing 0.2 phr. of the tris amino compound, was blended with 90 grams of the original diglycidyl ether to give a second product containing 0.02 phr. of the tris amino compound. Separate 10-gram portions (a) of untreated Vanoxy 126, (b) of the diglycidyl ether containing 0.2 phr. of tris amino compound, and (c) of diglycidyl ether containing 0.02 phr. of tris amino compound, were subjected to one freeze-thaw cycle. On completion of the cycles, it was observed that the two resins containing the tris amino compound remained clear and free from crystals, while the untreated resin had crystallized.

Example II

A prepolymer was prepared by mixing 10 grams of tris(hydroxymethyl)aminomethane with 100 grams of Vanoxy 126 diglycidyl ether of Example I. The mixture was heated to about 160° C. to form a clear solution. The prepolymer thus formed was used to introduce smaller amounts of the tris amino compound into Epon X–22, a highly purified diglycidyl ether of bisphenol A (of Shell Chemical Company). Epon X–22 is normally crystalline at room temperature. To 50 grams of Epon X–22 was added 0.8 gram of prepolymer; the mixture was heated to 100° C., then stirred for 30 minutes. The final product contained 0.14 phr. of tris(hydroxymethyl)aminomethane. Separate portions of this product and of the untreated Epon X–22 were placed in a deep freeze for 10 days and then allowed to come to room temperature. The compositions were observed daily for three months. The control composition crystallized within a week, while that containing 0.14 phr. of the tris amino compound had not crystallized after three months.

Example III

Two 50-gram portions of Epon X–22 diglycidyl ether of bisphenol A were heated to 150–160° C. and each blended with 6.5 grams of butyl glycidyl ether and 10 grams of Asbestine 3X brand talc. To one portion was added 0.1 gram of tris(hydroxymethyl)aminomethane to provide a concentration of 0.2 phr., while the second portion served as an untreated control. After the tris amino compound had all gone into solution, the two compositions were placed in a freezer for 24 hours, then allowed to come to room temperature. Neither sample had crystallized on the second day after thawing, so each was subjected to a second freeze-thaw cycle. Under these conditions, the control sample crystallized to a solid mass in the freezer and did not melt on returning to room temperature. The blend containing 0.2 phr. of the tris amino compound did not freeze during two freeze-thaw cycles and had not crystallized when examined one month later.

Example IV

A 700-gram sample of DER 332, a very pure diglycidyl ether of bisphenol A (of Dow Chemical Company) was heated to 150° C. in a 1-liter breaker and one 100-gram portion removed to serve as uninhibited control. To the remaining 600 grams of DER 332 was added 0.5 gram of tris(hydroxymethyl)aminomethane to give a concentration of 0.08 phr., and the mixture was heated and stirred until the tris amino compound had completely dissolved. To separate 100-gram portions of this inhibited resin and the uninhibited resin were added 13 grams of butyl glycidyl ether and 20 grams of Asbestine 3X talc. The compositions thus formed were placed in a freezer for 24 hours and then brought to room temperature. The uninhibited control resin crystallized after 7 hours at room temperature, while that containing the tris amino crystallization inhibitor remained liquid; it remained liquid after a second freeze-thaw cycle.

Example V

To 100 gram portions of untreated Vanoxy 126 resin and Vanoxy 126 resin treated with 1 phr. of tris(hydroxymethyl)aminomethane warmed to 65° C. was added the stoichiometric quantity of m-phenylenediamine curing agent. (The quantities were calculated on the WPE of each resin.) The compositions thus formed were blended thoroughly. Portions of each were poured into heat distortion bar molds and cured in a circulating air oven for two hours at 85° C., followed by three hours at 150° C. The bars were cooled, removed from the molds, and heat distortion points determined according to ASTM method D648–56. Results on duplicate determinations follow:

| | Compositions | |
|---|---|---|
| | A | B |
| Vanoxy 126, grams | 100 | |
| Vanoxy 126 (1 phr. tris amino) grams | | 100 |
| m-Phenylenediamine, grams | 14.5 | 14.0 |
| Heat distortion point, °C | 157, 158 | 158, 159 |

Thus it is shown that the presence of 1 phr. of tris(hydroxymethyl)aminomethane has no adverse effect on the heat distortion point of the cured resin prepared from diglycidyl ether containing this compound as a crystallization inhibitor.

We claim:

1. An epoxy resin composition consisting essentially of the diglycidyl ether of 2,2-bis(4-hydroxyphenyl)propane and from about 0.02 part to 1 part of tris(hydroxymethyl)aminomethane per 100 parts of the diglycidyl ether to inhibit crystallization.

2. An epoxy resin composition consisting essentially of the diglycidyl ether of 2,2-bis(4-hydroxyphenyl)-propane, a reactive diluent, and from about 0.02 part to 1 part of tris(hydroxymethyl)aminomethane per 100 parts of the diglycidyl ether to inhibit crystallization.

3. The resin of claim 2, wherein the reactive diluent is selected from the group consisting of butyl glycidyl ether, phenyl glycidyl ether, cresyl glycidyl ether, allyl glycidyl ether, gamma-butyrolactone, the glycidyl ether of a long chain aliphatic alcohol, and the glycidyl ester of aliphatic monocarboxylic $C_9$–$C_{11}$ fatty acids consisting principally of acids having a tertiary carbon alpha to the carboxyl group.

4. An epoxy resin composition consisting essentially of the diglycidyl ether of 2,2-bis(4-hydroxyphenyl)-propane, an organic solvent nonreactive therewith, and from about 0.02 part to 1 part of tris(hydroxymethyl)aminomethane per 100 parts of the diglycidyl ether to inhibit crystallization.

5. The resin of claim 4, wherein the organic solvent is selected from the group consisting of lower aromatic hydrocarbons, lower aliphatic and cycloaliphatic ketones, and lower alkyl esters of monocarboxylic lower aliphatic acids.

6. An epoxy resin composition consisting essentially of the diglycidyl ether of 2,2-bis(4-hydroxyphenyl)-propane, a filler, and from about 0.02 part to 1 part of tris(hydroxymethyl)aminomethane per 100 parts of the diglycidyl ether to inhibit crystallization.

7. The resin of claim 6, wherein the filler is selected from the group consisting of talc, silica, alumina, and calcium carbonate.

8. An epoxy resin composition consisting essentially of the diglycidyl ether of 2,2-bis(4-hydroxyphenyl)propane, and (2) a prepolymer of the diglycidyl ether of 2,2-bis-(4 - hydroxyphenyl)propane and tris(hydroxymethyl)-aminomethane, the level of the tris amino compound in the composition being from about 0.02 part to 1 part per 100 parts of the diglycidyl ether.

9. A process for inhibiting the crystallization of the diglycidyl ether of 2,2 - bis(4 - hydroxyphenyl)propane which comprises incorporating into 100 parts of the diglycidyl ether from about 0.02 part to 1 part of tris(hydroxymethyl)aminomethane.

10. A process for inhibiting the crystallization of the diglycidyl ether of 2,2-bis(4-hydroxyphenyl)propane which comprises the steps of (1) forming a prepolymer by dissolving tris(hydroxymethyl)aminomethane in about 5 to 15 parts by weight of the diglycidyl ether, and (2) combining the prepolymer with amounts of the diglycidyl ether sufficient to provide a final product containing from 0.02 part to 1 part of the tris amino compound per one hundred parts of the diglycidyl ether.

References Cited

UNITED STATES PATENTS 2,888,422  5/1959  Johnson et al. _____ 260—45.9
3,288,744  11/1966  Holub et al. _____ 260—45.9

L. T. JACOBS, Primary Examiner

U.S. Cl. X.R.

260—47, 830, 37, 32.8, 33.6